United States Patent [19]
Henze et al.

[11] Patent Number: 6,053,446
[45] Date of Patent: Apr. 25, 2000

[54] DRAG SYSTEM FOR ACCOMMODATING THERMAL EXPANSION

[75] Inventors: Herbert Henze, Philadelphia; Charles E. Jewell, Green Lane, both of Pa.

[73] Assignee: Penn Fishing Tackle Manufacturing Co., Philadelphia, Pa.

[21] Appl. No.: 09/222,118

[22] Filed: Dec. 29, 1998

[51] Int. Cl.[7] .................................................. A01K 89/015

[52] U.S. Cl. ............................................ 242/321; 242/271

[58] Field of Search ..................................... 242/321, 270, 242/271

[56] References Cited

U.S. PATENT DOCUMENTS

| | | | |
|---|---|---|---|
| 4,545,937 | 10/1985 | Hideo | 242/271 |
| 4,852,826 | 8/1989 | Sato | 242/270 |
| 5,086,991 | 2/1992 | Johansson | 242/321 |
| 5,297,756 | 3/1994 | Ikuta | 242/270 |
| 5,318,246 | 6/1994 | Ikuta | 242/271 |
| 5,560,562 | 10/1996 | Hartmann | 242/271 |

*Primary Examiner*—Katherine A Matecki
*Attorney, Agent, or Firm*—Frank J. Benasutti

[57] ABSTRACT

A drag system for a fishing reel provides thermal expansion of the spool by having an outboard bearing which does not direct any force against the proximate shoulder of the spool.

5 Claims, 5 Drawing Sheets

DRAG SYSTEM FOR ACCOMMODATING THERMAL EXPANSION

BACKGROUND OF THE INVENTION

This invention relates to fishing reels and, in particular, to a structure designed to reduce the effects of thermal expansion caused by engagement of a "drag" mechanism in the reel.

DESCRIPTION OF THE PRIOR ART

In fishing reels, it is commonplace to have drag washers which are engaged by the spool of the reel to put tension on the line. See, for example, U.S. Pat. Nos. 4,871,129, 5,219,131, 5,601,245, 4,742,974 and 4,516,741. The '741 patent shows a common system wherein the spool is literally trapped between two bearings 3 and 6. There is no allowance for thermal expansion of that spool. As the line is played out or reeled in, the rubbing of the drag friction plates causes heat to build up. Since the spool upon which the line is wound expands with this heat, it tends to grab more, and this affects the drag (much the same way as any brake surface would heat up on application of the brake while the wheel is still turning).

One patent which seems to have recognized the problem of heat build-up, albeit by a different mechanism than our invention, is U.S. Pat. No. 5,318,246.

SUMMARY OF THE INVENTION

To reduce this effect, we have found a way of mounting the spool, so that as it expands it does not tend to bind up and change the effective drag. It is a means for allowing a spool bearing to float within a spool pocket. In accordance with our invention, in a fishing reel having a drag mechanism means and a spool mounted for rotation therein about an axis and positioned to engage said drag mechanism means to slow the rotation of the spool, said engagement creating heat and said heat causing thermal expansion of the spool in an axial direction, we have provided the improvement comprising: a bearing mounting means supporting said spool for allowing for thermal expansion in an axial direction and thereby decreasing the increase in drag force which otherwise would occur if said spool was axially restrained; said bearing mounting means further comprising a plurality of bearings, one of which is mounted in a pocket in said spool so as to engage said spool on its outer periphery without restraining the spool other than by frictional force.

In addition, the bearing mounting means most preferably comprises: two bearings supporting said spool spaced from one another by a spacer and at least one spring means in engagement with said bearings. The spring means comprises at least one and preferably a number of spring washers.

In one embodiment of our invention, two bearings so support said spool and one of said bearings is retained in a fixed axial position against a shoulder within said spool by a retaining ring mounted in a slot in said spool. In another embodiment, two bearings so support said spool and one of said bearings is retained in a fixed axial position against a shoulder within said spool by a retaining ring mounted in a slot in said spool, and a plurality of spring, washers are provided mounted against and between said bearing and a retaining ring axially fixed on a shaft supporting said bearing.

DESCRIPTION OF THE PREFERRED EMBODIMENTS

Figure 1:
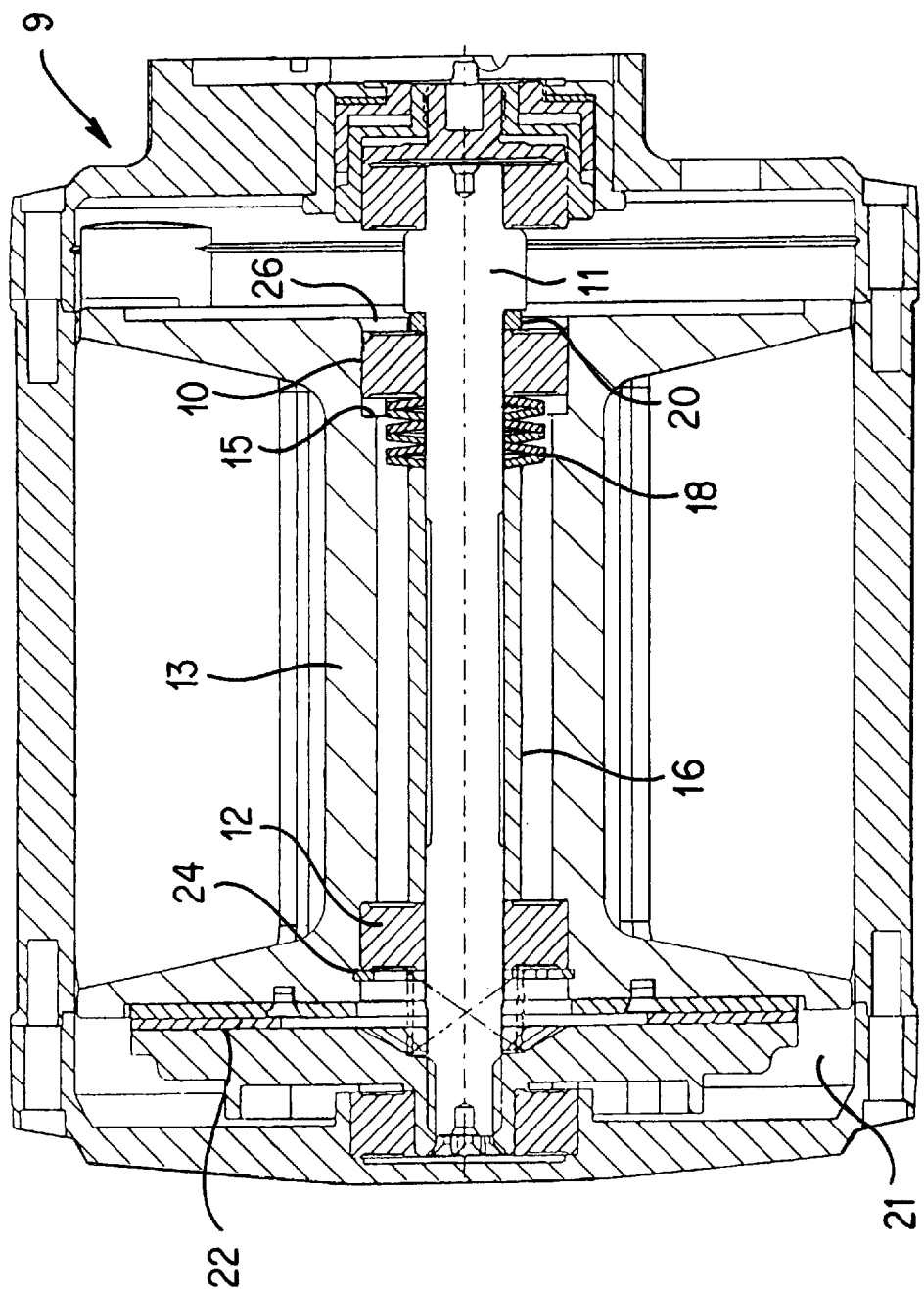
FIG. 1 is a cross-section of a portion of a fishing reel in accordance with a preferred embodiment of our invention.

Referring to the accompanying figures, FIG. 1 shows a cross-section of a reel designated generally 9 having a drive shaft 11 upon which is mounted a spool 13. Bearings are shown at 10 and 12 for mounting the spool 13 on the shaft 11 so that the spool is free to rotate about the shaft. The bearing 12 seats against an internal shoulder on the spool 13, whereas, the bearing 10 is spaced from the internal shoulder 15, as shown. Between the bearings, there is a sleeve 16 and a plurality of spring, washers designated generally 18. The side of the bearing 10 opposite from the spring, washers engages a spacer 20 which, in turn, engages a shoulder on the shaft 11. The spool 13 is the part which will expand with heat. In FIG. 1, for a new drag system for a single drag reel, it will be noted that if pressure is applied from right to left against the spacer 20, this would translate to force being applied to the bearing 10, which would push on the spring washers 18 and the sleeve 16, and the bearing 12 at the left end. A retaining ring 24, fixed in the spool 13, engages the bearing 12. Thus the force on the spool 13 will push it against the drag washer designated generally 22.

However, the other end of the spool 13 is free to move to the right, in response to thermal expansion caused by heat build-up in the drag mechanism means (designated generally 21), since the bearing 10 is floating in a pocket designated generally 26 in the spool 13.

Figure 2:
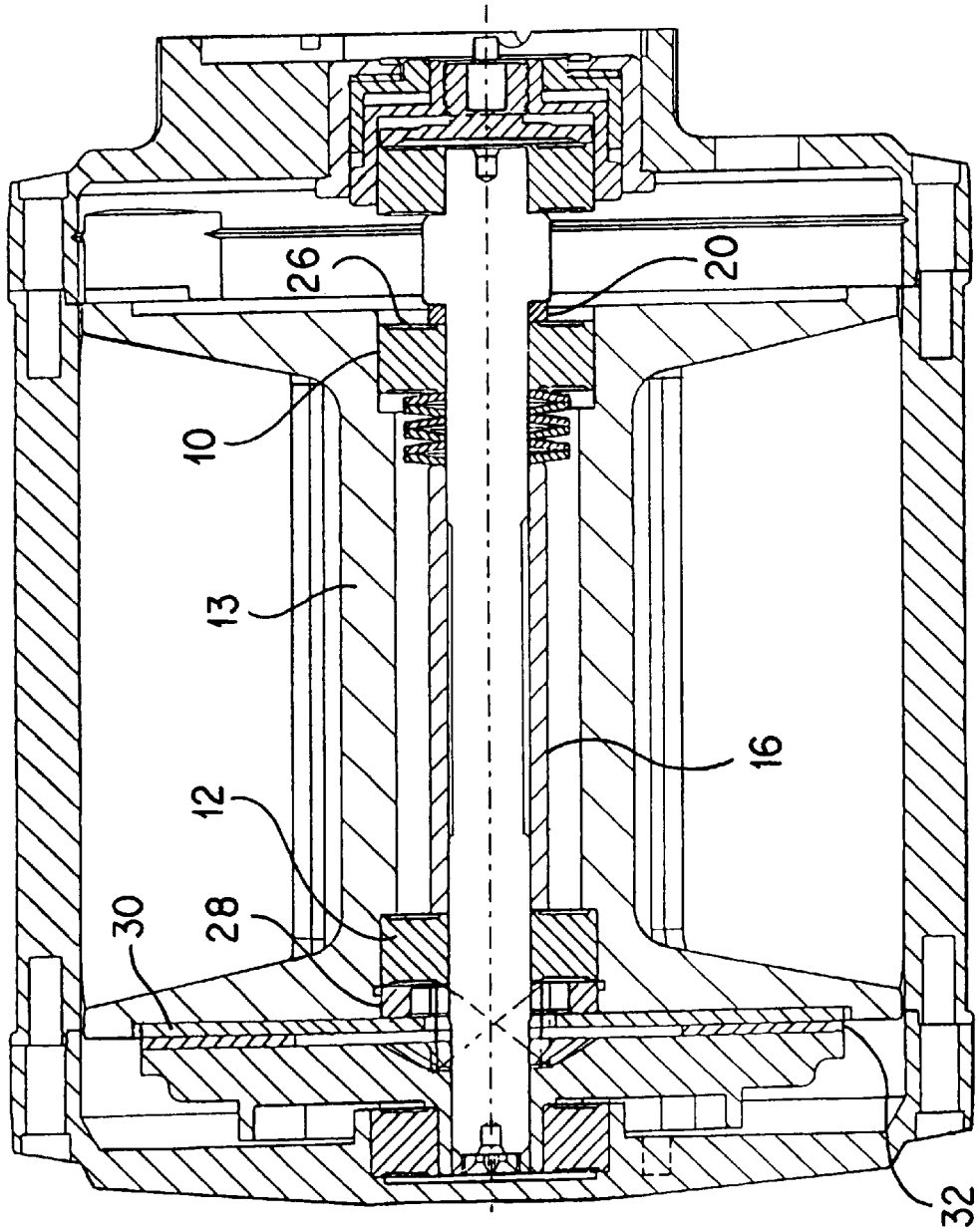
FIG. 2 is a cross-section similar to FIG. 1 showing another embodiment of our invention.

In FIG. 2, covering an alternate embodiment of a new drag system for a single drag reel, the only difference is that the retaining ring 24 of the type shown in FIG. 1 is replaced with a spacer 28. The second bearing 12 pushes on the spacer 28 rather than the retaining ring 24. The drag plate 30 is fixed to the spool 13 in any event, and the drag plate 30 pushes against the drag washer 32 of the drag mechanism means. Here again, the first bearing 10 is floating in a pocket 26 in the spool 13.

Figure 3:
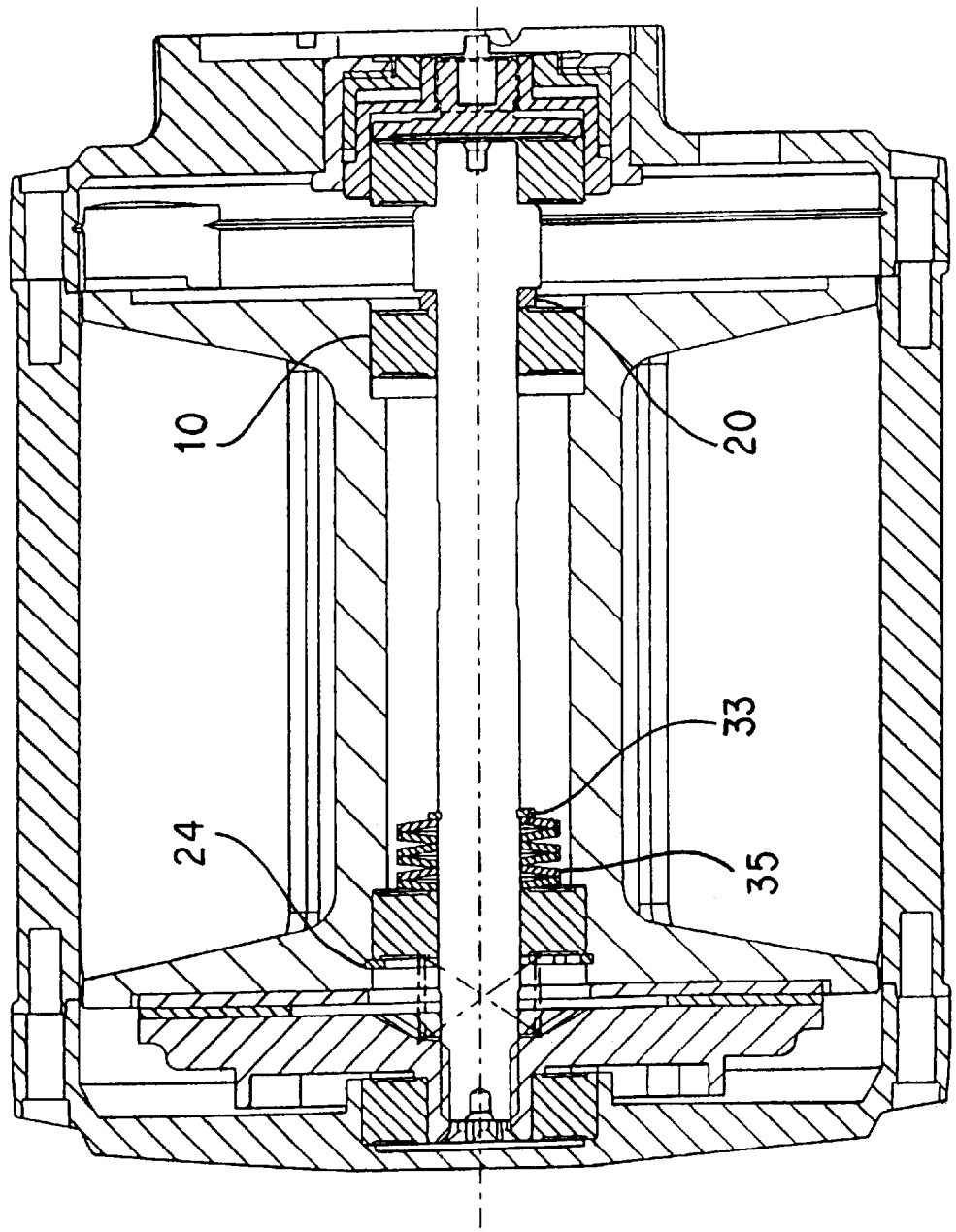
FIG. 3 is a cross-section of a reel showing a further alternate embodiment of our invention.

In FIG. 3, another alternate embodiment of a new drag system for a single drag reel is illustrated. Therein, a retaining ring 33 and a group of spring washers (designated generally 35) replace the sleeve 16 and spring washers 18 of the prior two figures.

Figure 4:
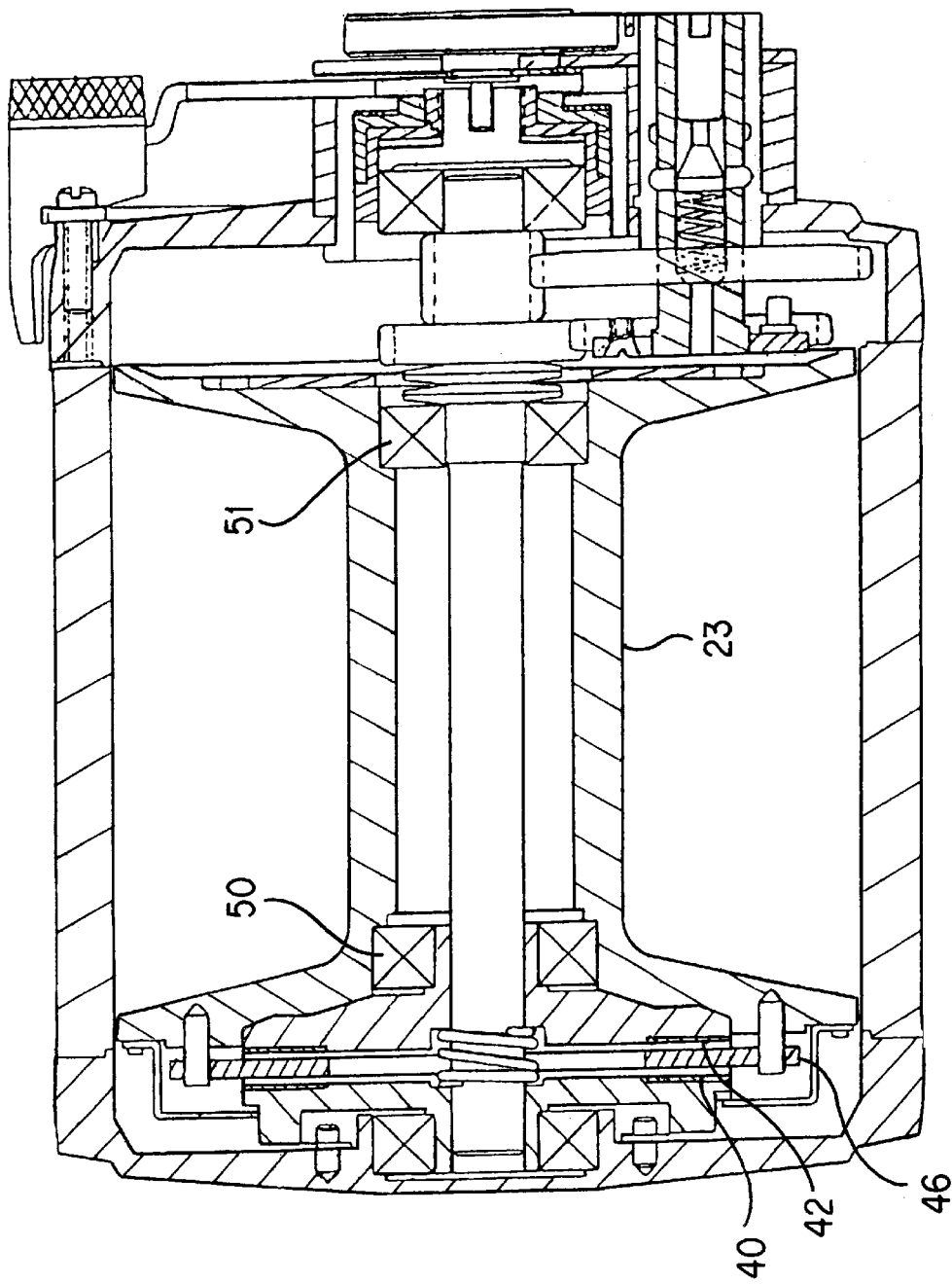
FIG. 4 is a cross-section of a dual drag prior art reel.
Figure 5:
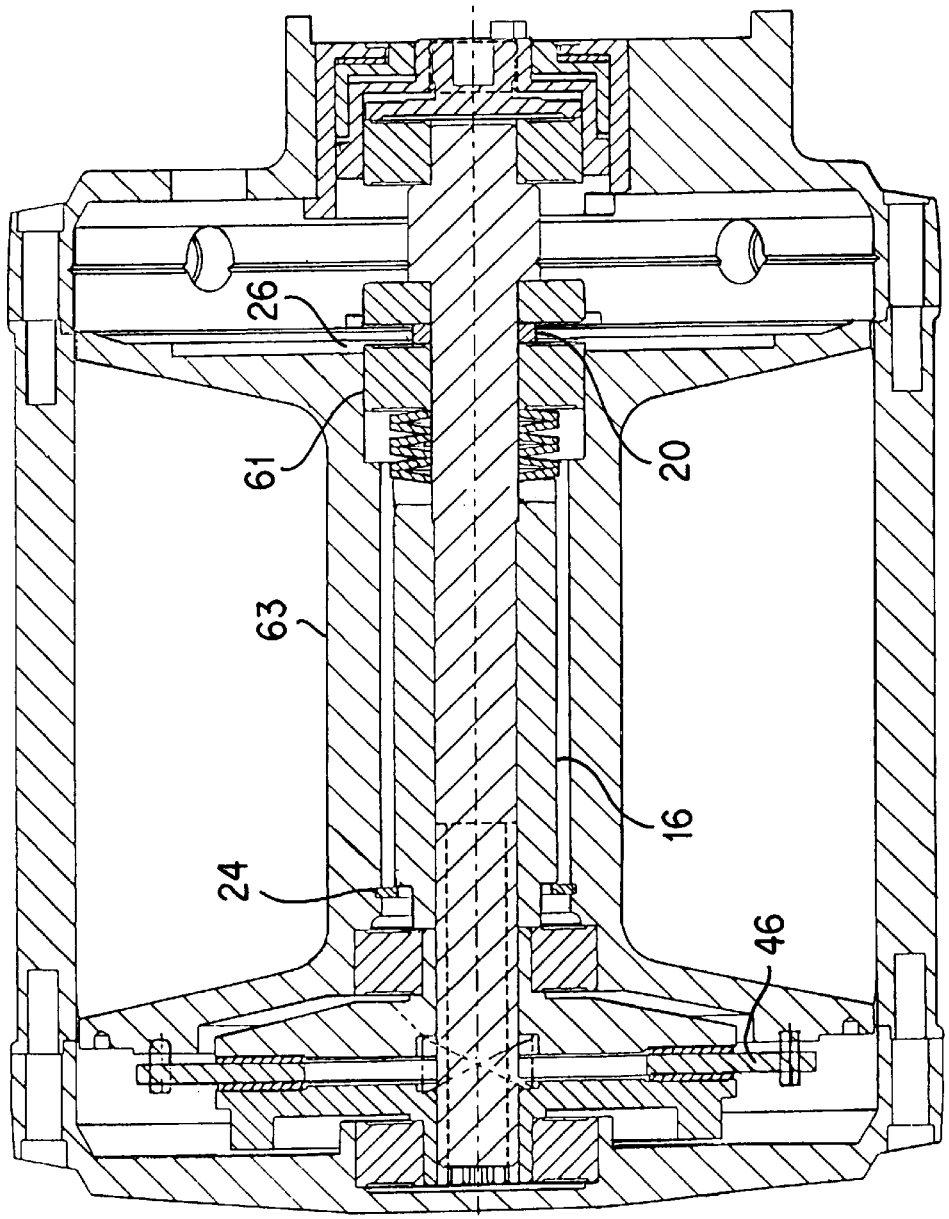
FIG. 5 is a cross-section of a reel showing a further alternate embodiment of our invention.

A prior art dual drag reel and spool mechanism is shown in FIG. 4. It should be readily understood that there are two drag plates 40, 42 impinging upon a plate 46 attached to the spool 23. Bearing 50 impinges directly on a shoulder on the spool 23 as does bearing, 51.

Applying our invention to this type of prior art device, we have the same arrangement as we did in FIG. 1 when the bearing is in a pocket. There is a plurality of spring washers impinging upon a spacer which, in turn, impinges upon a retaining ring. The spacer pushes against the bearing which, in turn, forces engagement of the drag mechanism. As heat builds up, the outermost bearing 61 being positioned in the pocket in the reel 63 permits thermal expansion of the reel as it heats up, so that it is free to move to the right.

In its broadest sense, the invention comprises putting at least one bearing in the device such that the spool can expand in a direction away from the contact between the spool and the drag apparatus.

What we claim is:

1. In a fishing reel having a drag mechanism and a spool mounted for rotation therein about an axis and positioned to engage said drag mechanism to slow the rotation thereof, said engagement creating heat and said heat causing thermal expansion in an axial direction, the improvement comprising: a bearing mounting means supporting said spool for allowing for thermal expansion in an axial direction and thereby decreasing the increase in drag force which otherwise would occur if said spool was axially restrained; said bearing mounting means comprising two bearings spaced from one another by a spacer one of said bearings being mounted in a pocket in said spool so as to engage said spool on its outer periphery without restraining the spool other than by frictional force; and at least one spring means in engagement with said bearings.

2. The fishing reel of claim 1, wherein the spring means comprises a spring washer.

3. The fishing reel of claim 1, wherein the spring means comprises a plurality washer spring washers.

4. The fishing reel of claim 1, wherein: of said bearings is retained in a fixed axial position against a shoulder within said spool by a retaining ring mounted in a slot in said spool.

5. The fishing reel of claim 1, wherein: one of said bearings is retained in a fixed axial position against a shoulder within said spool by a retaining ring mounted in a slot in said spool; and a plurality of spring washers are provided mounted against and between said bearing and a retaining ring axially fixed on a shaft supporting said bearing.

* * * * *

UNITED STATES PATENT AND TRADEMARK OFFICE
CERTIFICATE OF CORRECTION

PATENT NO : 6,053,446
DATED : April 25, 2000
INVENTOR(S) : Herbert O. Henze and Charles E. Jewell It is certified that error appears in the above-identified patent and that said Letters Patent is hereby corrected as shown below:

Please correct Claim 4 to read:

4. The fishing reel of claim 1, wherein *one* of said bearings is retained in a fixed axial position against a shoulder within said spool by a retaining ring mounted in a slot in said spool.

Signed and Sealed this

Twenty-second Day of May, 2001

*Attest:*

NICHOLAS P. GODICI

*Attesting Officer*     Acting Director of the United States Patent and Trademark Office